US012688099B2

(12) United States Patent
Medeiros et al.

(10) Patent No.: US 12,688,099 B2
(45) Date of Patent: Jul. 21, 2026

(54) METHOD AND APPARATUS FOR NODE-PAIR ENCLOSURE REPLACEMENT

(71) Applicant: Dell Products L.P., Round Rock, TX (US)

(72) Inventors: Earl Medeiros, Fall River, MA (US); Julie Zhivich, Westborough, MA (US); Jerome Cartmell, Millis, MA (US); James Guyer, Northboro, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 180 days.

(21) Appl. No.: 18/627,641

(22) Filed: Apr. 5, 2024

(65) Prior Publication Data

US 2025/0315351 A1 Oct. 9, 2025

(51) Int. Cl.
*G06F 11/16* (2006.01)
*G06F 11/20* (2006.01)

(52) U.S. Cl.
CPC ...... *G06F 11/1662* (2013.01); *G06F 11/2005* (2013.01); *G06F 11/2007* (2013.01); *G06F 11/2046* (2013.01); *G06F 11/2089* (2013.01); *G06F 11/2092* (2013.01); *G06F 11/2094* (2013.01); *G06F 2201/805* (2013.01)

(58) Field of Classification Search
CPC ............ G06F 11/1662; G06F 11/2005; G06F 11/2007; G06F 11/2046; G06F 11/2089; G06F 11/2092; G06F 11/2094; G06F 2201/805
See application file for complete search history.

(56) References Cited

U.S. PATENT DOCUMENTS

| | | | | |
|---|---|---|---|---|
| 9,811,272 | B1 * | 11/2017 | Lecrone | .............. G06F 11/2069 |
| 2008/0225701 | A1 * | 9/2008 | Pimlott | .............. G06F 11/2007 |
| | | | | 370/221 |
| 2011/0296100 | A1 * | 12/2011 | Plank | .................. G06F 11/1662 |
| | | | | 711/E12.019 |
| 2021/0247935 | A1 * | 8/2021 | Beygi | .................. G06F 3/0607 |
| 2022/0236884 | A1 * | 7/2022 | Zhang | .................. G06F 3/0617 |
| 2025/0147918 | A1 * | 5/2025 | Mao | ...................... G06F 1/3287 |

* cited by examiner

*Primary Examiner* — Marc Duncan
*Assistant Examiner* — Michael Xu
(74) *Attorney, Agent, or Firm* — DALY, CROWLEY, MOFFORD & DURKEE, LLP

(57) ABSTRACT

Methods and apparatuses for online replacement of a node enclosure are provided. A storage array system includes a node-pair housed in a node enclosure. Each node of the node-pair are be linked to a network and further linked to each other by external interconnects, independent of the enclosure. The interconnects couple the first storage node to the second storage node externally of the node enclosure. The node-pairs are configured to communicate independently of the node enclosure and the enclosure is replaceable without disruption of communication over the network.

20 Claims, 7 Drawing Sheets

METHOD AND APPARATUS FOR NODE-PAIR ENCLOSURE REPLACEMENT

BACKGROUND

In certain storage arrays, node-pairs are housed to an enclosure that includes a midplane. The midplane has several PCIe links which allow for inter-node-pair communications. If a failure in the midplane is detected, the enclosure must be replaced. In some hardware designs, it is not possible to replace the enclosure while keeping the system online. Such a limitation arises because all the PCIe links are internal to the enclosure. Accordingly, if a problem occurs with the enclosure itself, including the midplane, both nodes housed in the enclosure must be taken offline for a period of time while the enclosure is repaired and/or replaced.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, a method may include providing a first enclosure having a first storage node coupled to a second storage node by a first interconnect externally of the first enclosure. The first storage node and the second storage node may communicate independently of the first enclosure. A second enclosure may have a third storage node coupled to a fourth storage node by a second interconnect externally of the second enclosure. The third storage node and the fourth storage node may communicate independently of the second enclosure. A network may couple each of the first storage node and the second storage node of the first enclosure to the third storage node and the fourth storage node of the second enclosure. A failure may be detected in the first enclosure and the first enclosure may be replaced without interrupting communication between the first storage node and the second storage node.

The method may include, alone or in combination, one or more of the following features. Replacing the first enclosure may include disabling the first storage node and disconnecting the first interconnect to the second storage node. The first storage node may be moved to a third enclosure. The first storage node in the third enclosure may be coupled to the second storage node in the first enclosure with the first interconnect and the first storage node may be enabled. A first synchronization of the first storage node and the second storage node may be performed. The second storage node in the first enclosure may be disabled and the first interconnect to the first storage node in the third enclosure may be disconnected. The second storage node may be moved to a fourth enclosure. The second storage node in the fourth enclosure may be coupled to the first storage node in the third enclosure with the first interconnect and the second storage node may be enabled. A second synchronization of the second storage node in the fourth enclosure may be performed with the first storage node in the third enclosure. The first storage node in the third enclosure may be disabled and the first interconnect to the second storage node may be disconnected. The first storage node may be moved to the fourth enclosure. The first storage node in the fourth enclosure may be coupled to the second storage node with the first interconnect and the first storage node may be enabled. A third synchronization of the first storage node and the second storage node may be performed. Performing the first synchronization, the second synchronization and the third synchronization may include mirroring the first storage node and the second storage node.

According to another aspect, a system may comprise a first node enclosure housing a first storage node and a second storage node. A second node enclosure may be coupled to the first node enclosure by a network. A first interconnect may couple the first storage node to the second storage node externally of the first node enclosure. The first storage node and second storage node may be configured to communicate independently of the first node enclosure and the first node enclosure may be replaceable without disruption of communication over the network.

The system may further include, alone or in combination, one or more of the following features. The second node enclosure may house a third storage node and a fourth storage node coupled by a second interconnect externally of the second node enclosure. The third storage node and fourth node may be configured to communicate independently of the second node enclosure. The network may be an Infini-Band network. The network may be an unswitched network. The first interconnect may include a peripheral component interconnect express (PCIe) interface. The first storage node may include a first host channel adapter coupled to the network and the second storage node may include a second host channel adapter coupled to the network. The first storage node may include a first peripheral interconnect card configured to receive the first interconnect and the second storage node may include a second peripheral interconnect card configured to receive the first interconnect. The first storage node and the second storage node may be mirrored storage devices. The first interconnect may include redundant connections to the first storage node and the second storage node.

According to another aspect, a storage system may include a first node enclosure housing a first storage node and a second storage node. A first interconnect may couple the first storage node to the second storage node externally of the first node enclosure. A second node enclosure may house a third storage node and a fourth storage node. A second interconnect may couple the third storage node to the fourth storage node externally of the second node enclosure. An unswitched network may couple the first storage node to the third storage node and the fourth storage node and may couple the second storage node to the third storage node and fourth storage node. The first storage node may be configured to communicate with the second storage node independently of the first node enclosure. The third storage node may be configured to communicate with the fourth storage node independently of the second node enclosure. One of the first node enclosure or the second node enclosure may be replaceable without disruption of communication over the unswitched network.

The system may include, alone or in combination, one or more of the following features. The unswitched network may be an InfiniBand network. The first interconnect and the second interconnect may include peripheral component interconnect express (PCIe) interfaces. Each of the first storage node, the second storage node, the third storage node and the fourth storage node may include a host channel adapter coupled to the unswitched network. Each of the first storage node and the second storage node may include peripheral interconnect cards configured to receive the first interconnect and each of the third storage node and the fourth storage node may include peripheral interconnect cards configured to receive the second interconnect. The first storage node may be configured to mirror the second storage node and the third storage node may be configured to mirror the fourth storage node. The first interconnect may include redundant connections to the first storage node and the second storage node, and the second interconnect may include redundant connections to the third storage node and the fourth storage node.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
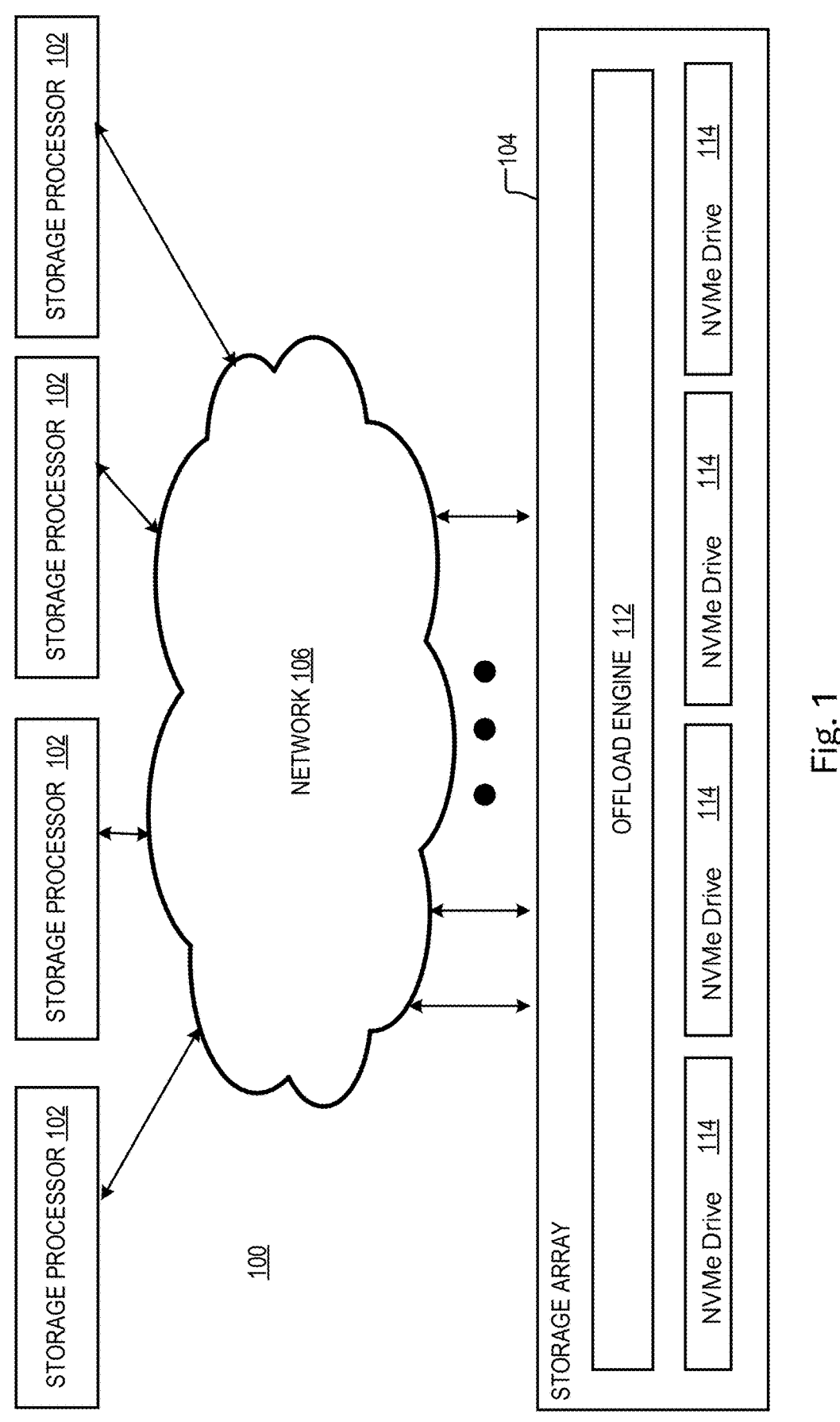
FIG. 1 is a diagram of an example of a storage array system, according to aspects of the disclosure.

FIG. 1 is a diagram of an example of a storage array system 100, according to aspects of the disclosure. As illustrated, the system 100 may include a plurality of storage processors 102, a network 106, and a storage array 104. The network 106 may include or be an InfiniBand network. The storage array 104 may include an offload engine 112 and a plurality of Non-Volatile Memory Express (NVME) drives 114 (hereinafter "storage devices" 114). In operation, each of the storage processors 102 may receive write requests, cache the data requested to be written, and subsequently offload the cached data to the offload engine 112. The offload engine 112 may be configured to store the cached data permanently in the storage devices 114. Although, in the example of FIG. 1, network 106 is an InfiniBand network, it will be understood that alternative implementations are possible in which network 106 includes any suitable type of network, such as a local area network (LAN), a wide area network (WAN), the Internet, a mobile data network (e.g., a 5G network), etc. Although in the example of FIG. 1 each of the storage devices 114 is an NVME drive, alternative implementations are possible in which one or more of the storage devices 114 is a hard disk, a Solid-State drive, and/or any other suitable type of storage device.

Figure 2:
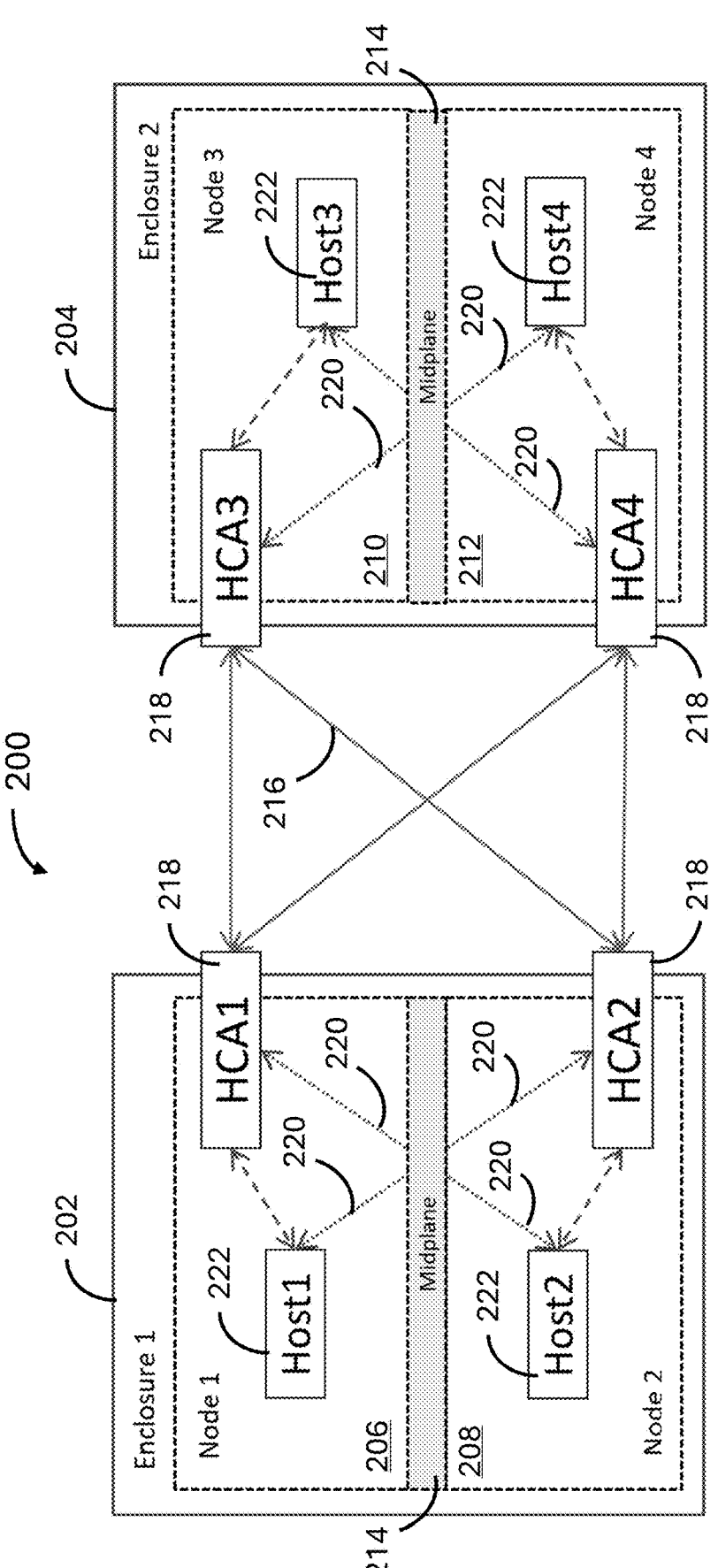
FIG. 2 is a diagram of a two-enclosure storage array system.

FIG. 2 is a diagram of a two-enclosure storage array 200. The storage array 200 may be part of a storage system like that shown in FIG. 1. The storage array 200 of FIG. 2 represents a configuration in which multiple nodes are housed and interconnected through a node enclosure. For example, the storage array 200 may include four nodes: a first node 206 and a second node 208 housed in a first enclosure 202, and a third node 210 and fourth node 212 housed in a second enclosure 204.

Each node may include similar hardware and be configured in a similar manner. For example, each node may include a computing device, such as a host 222, for managing and controlling the operations on each node. In the configuration of FIG. 2, each node may use a fabric hardware, such as host channel adapters (HCA) 218 to allow for communication over a fabric network 216. The fabric network 216 may be InfiniBand (IB) with no internal fabric switches. The HCAs 218 may provide each node access to other system nodes either through IB links (i.e., over fabric network 216), or through PCIe crosslinks, such as interconnects 220, though the midplanes 214 of each enclosure 202, 204. Interconnects 220 coupled with the HCA 218 multi-host support may allow both the first node 206 and the second node 208 to share their HCAs 218 with each other. Only by sharing the HCAs 218, can nodes in a node-pair read and write to each other's memory. In the configuration of FIG. 2, access to the HCAs 218 is provided through the interconnects 220 connections to the midplane 214. If the interconnects 220 or the midplane 214 fail or otherwise compromised, then the nodes in a node-pair cannot access the other node's memory.

If any component tied to the enclosure, such as the first enclosure 202, interconnects 220 or midplane 214, fails or requires maintenance or replacement, in this configuration, the enclosure and both nodes must be taken offline. In high availability or critical application environments, losing an entire node-pair for any period of time is undesirable.

Figure 3A:
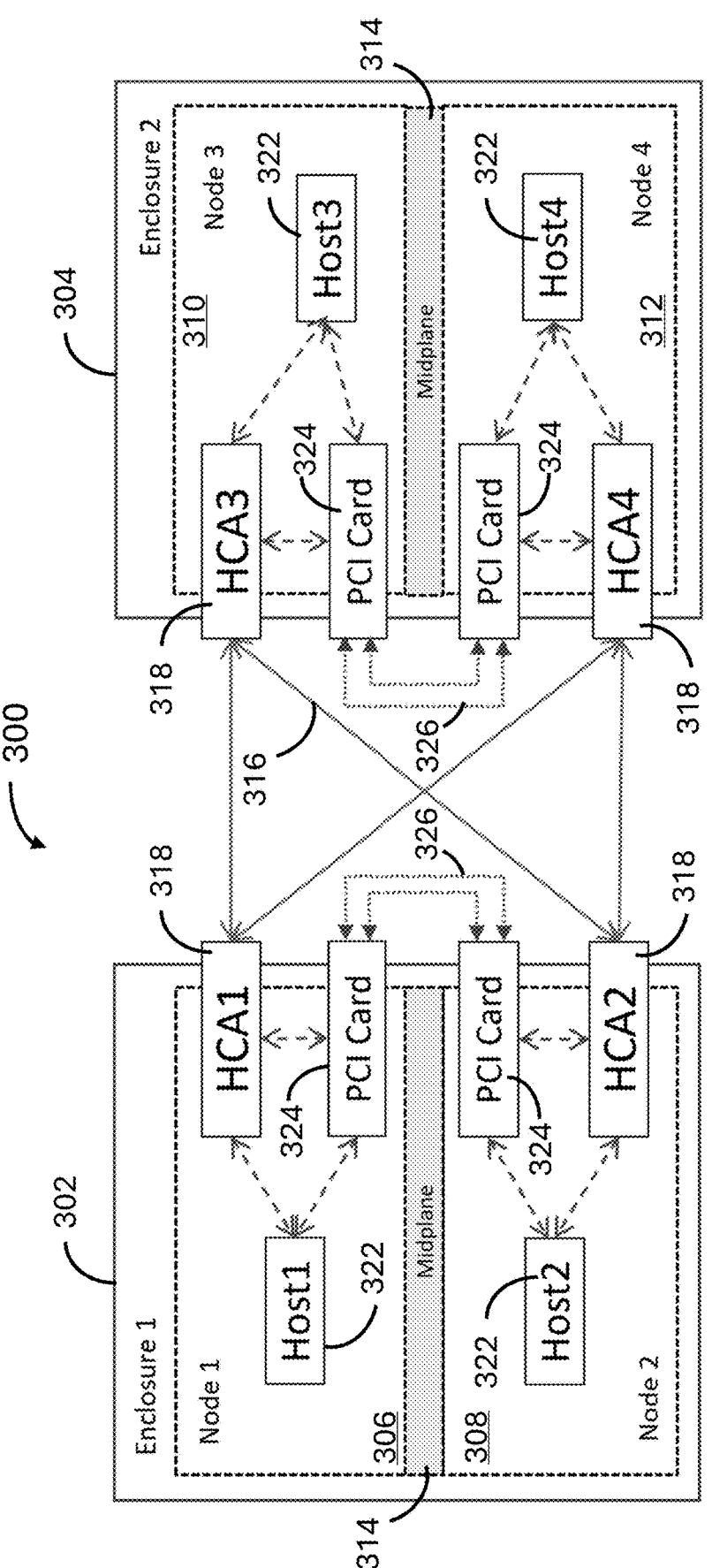
FIG. 3A is a diagram of a two-enclosure storage array system with external interconnects, according to aspects of the disclosure.
Figure 3B:
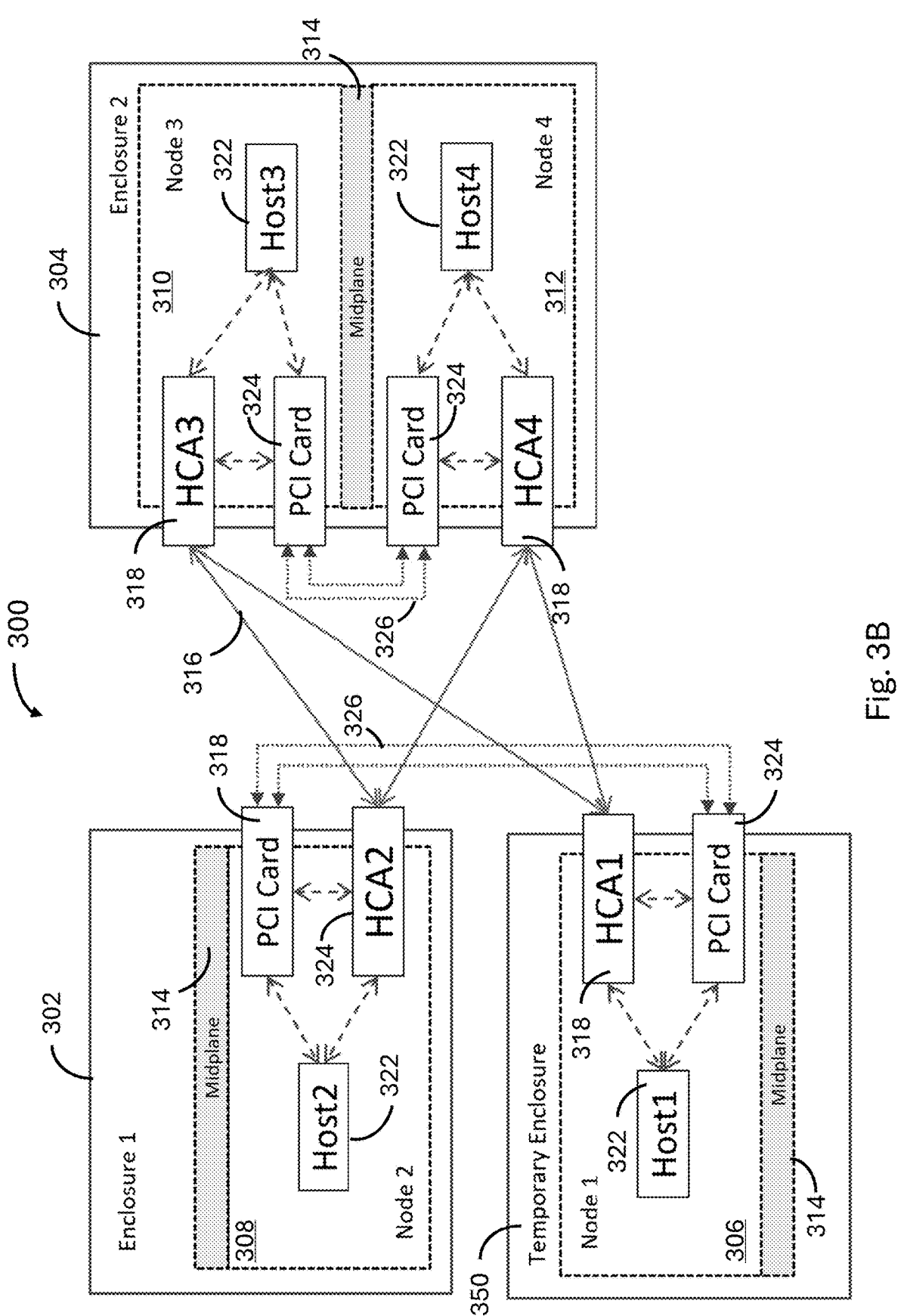
FIG. 3B is a diagram of a node enclosure replacement with a temporary enclosure, according to aspects of the disclosure.
Figure 3C:
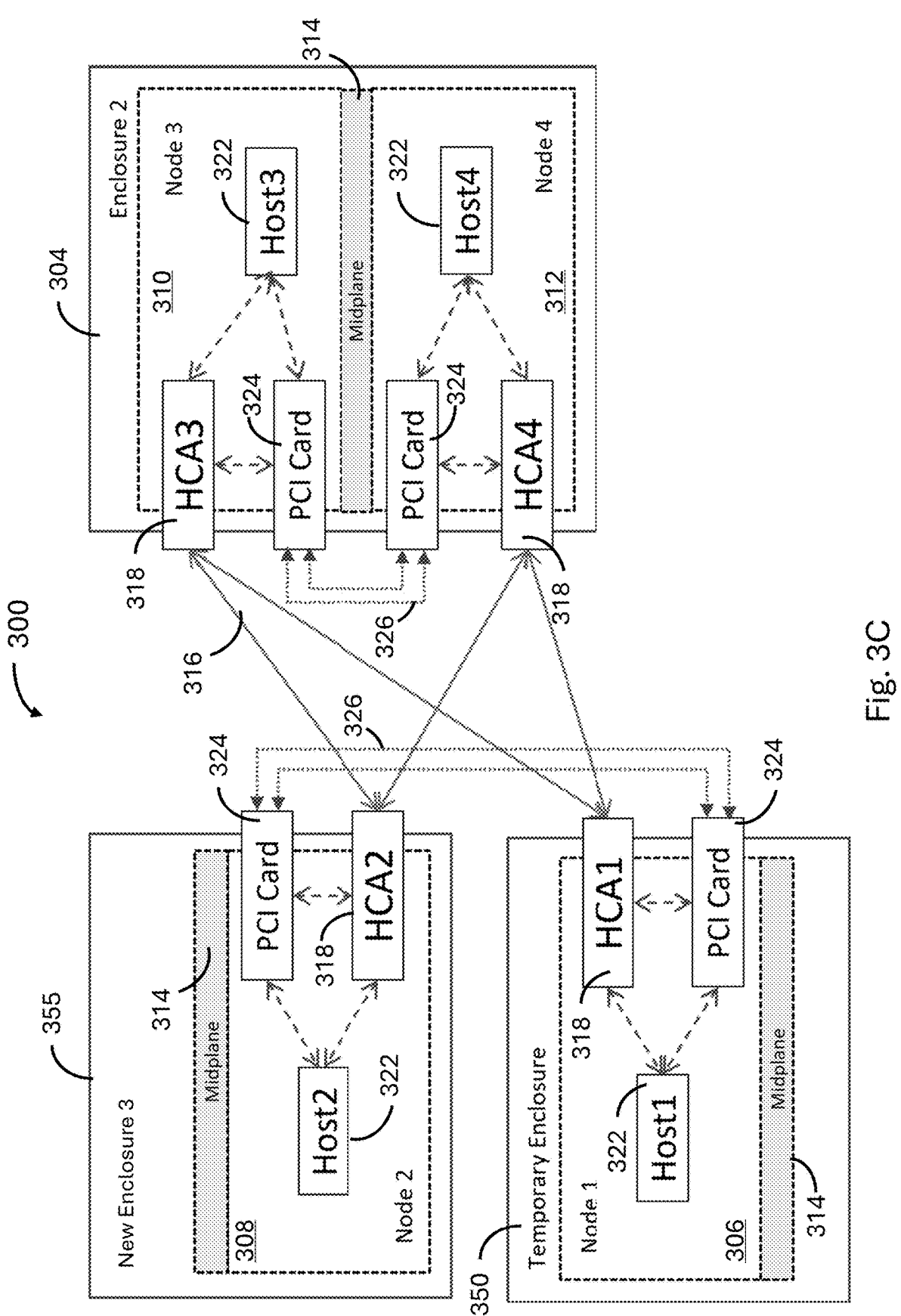
FIG. 3C is a diagram of a node enclosure replacement with a new enclosure, according to aspects of the disclosure.

According to aspects of the present disclosure, to perform an online enclosure replacement, crosslinks or interconnects external to the enclosure itself may be provided to ensure at least one of the nodes in the node-pair remains online. FIGS. 3A-3C show a two-enclosure storage array system 300 with external interconnects 326 and configured for online enclosure replacement according to one or more aspects of the disclosure. Like the configuration shown in FIG. 1, the storage array may include a first enclosure 302 and second enclosure 304. The first enclosure may include a first node 306 and a second node 308. The second enclosure 304 may include a third node 310 and a fourth node 312. Each node may include a host 322 and HCAs 318 for connecting each node to a fabric network 316. The fabric network 316 may be an unswitched IB fabric. In contrast to the configuration of FIG. 1, rather than interconnecting the HCAs 318 and hosts 322 through the midplane 314 of the enclosure, each node may include peripheral component interconnect express (PCIe) hardware, such as PCIe card 324, and external interconnects 326 linking the nodes of a node-pair. As used herein, "external" may include connections that do not pass through or rely on connections to the enclosure itself, for example, not using a midplane as a connection point between nodes housed in the same enclosure. According to one aspect, each PCIe card may be linked by redundant (i.e., two or more) interconnect cables.

According to one aspect, if a node enclosure, for example the first enclosure 302, experiences a problem or failure in the enclosure hardware or physical structure, it may require replacement. In replacing the first enclosure 302, a temporary enclosure 350 (FIG. 3B) may be brought onsite. The temporary enclosure 350 may be similar in structure and function to the first enclosure 302 or may be built and configured as a simplified and/or portable structure to facilitate its transportation and temporary installation. The temporary enclosure 350 may also include its own power supply or power source (not shown). The temporary enclosure 350 may not be the replacement enclosure. At the end of the replacement procedure, the temporary enclosure 350 may be removed along with the faulty first enclosure 302. As shown in FIG. 3B, after setting up the temporary enclosure 350, one node, for example the first node 306, may be taken offline and relocated from the faulty first enclosure 302 to the temporary enclosure 350. The HCA 318 of the first node 306 may be reconnected to the fabric network 316 and the PCIe card 324 of the first node 306 may be reconnected to the PCIe card 324 of the second node 308 in the first enclosure 302 with interconnects 326.

Once the first node 306 has been transferred to the temporary enclosure 350, the host 322, through software, may perform the task of resynchronizing (or re-mirroring) the data being stored in that node-pair (i.e., the first node 306 is resynchronized or re-mirrored with the second node 308, which has remained online). At the end of the resynchronization, both the first node 306 and the second node 308 will be online and fully mirrored, but located in different enclosures (i.e., the second node 308 in the first enclosure 302 and the first node 306 in the temporary enclosure 350). The second node 308 may then be taken offline, disconnected, and removed from the faulty first enclosure 302. The faulty first enclosure 302 may then be replaced with a third enclosure 355 (FIG. 3C). As shown in FIG. 3C, the second node 308 may be installed in the new third enclosure 355, the HCA 318 of the second node 308 may be reconnected to the fabric network 316, and the PCIe Card 324 reconnected to the first node 306 with the interconnects 326. Once the new third enclosure 355 has been installed with the second node 308, host software can again perform the task of resynchronizing the data stored in the node-pair, which will conclude with both nodes being online, but still in different enclosures. In a similar manner, the first node 306 may be taken offline, disconnected and moved to the new third enclosure 355, reconnected to the fabric network 316 and the second node via the interconnects 326, and resynchronized with the second node 308. The end configuration may be very similar to that shown in FIG. 3A, with the first enclosure 302 replaced by the third enclosure 355.

According to aspects of the disclosure, the online enclosure replacement process may provide the capability to maintain both nodes of a node-pair online and fully mirrored in different enclosures. In existing configurations, like the configuration shown in FIG. 2, such a process is not possible because the interconnects rely on the midplane 314 of an enclosure.

Figure 4:
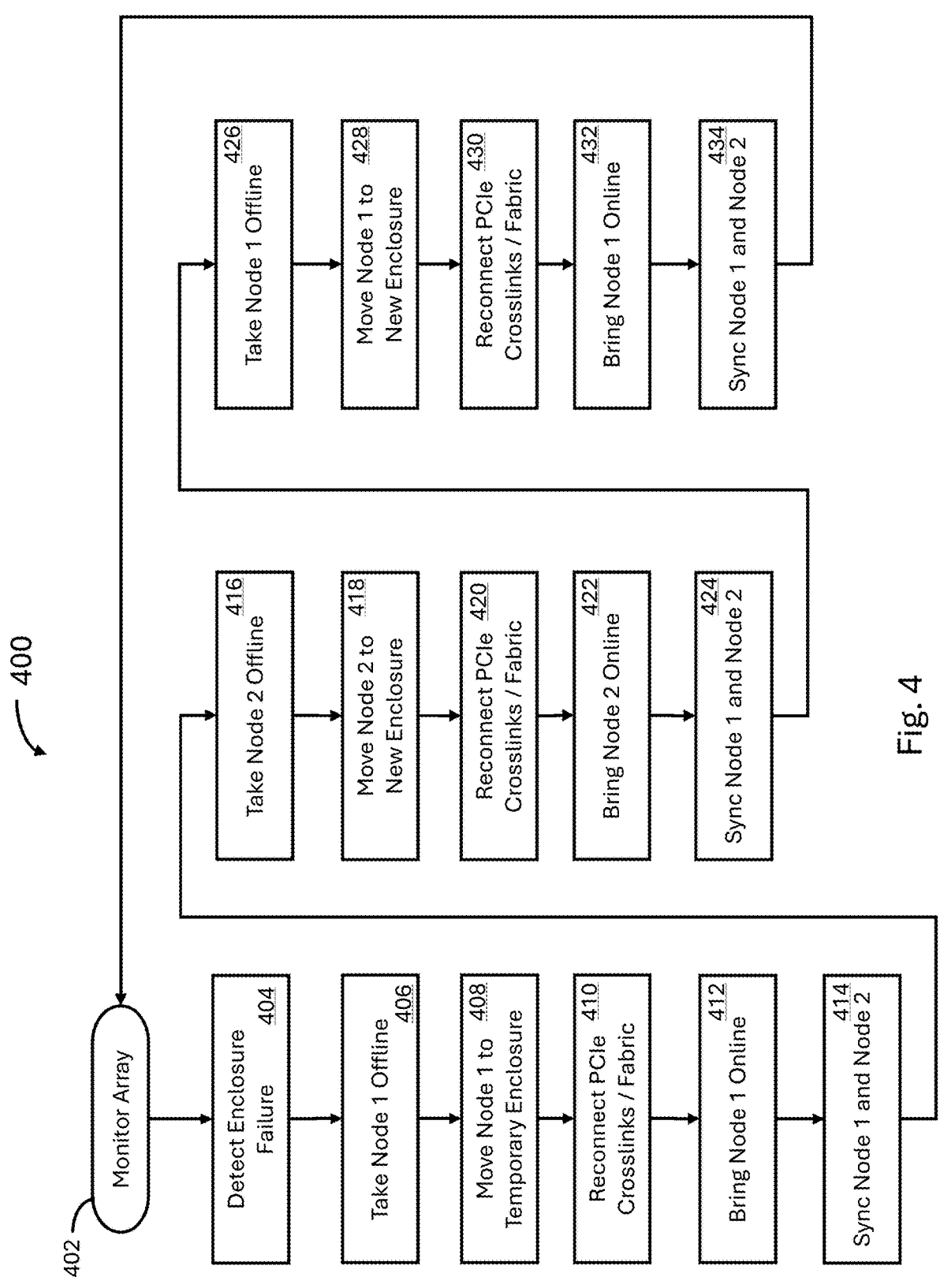
FIG. 4 is a flow diagram of a method of online replacement of a node enclosure according to aspects of the disclosure.

FIG. 4 is a flow diagram of a method 400 of online node enclosure replacement in a node-pair storage system, according to aspects of the disclosure. The method may begin, shown in block 402, with monitoring a storage array system for outages or faults. As shown in block 404, a node enclosure failure, outage, or other fault may be detected that requires the removal of a faulty enclosure from the system. As described herein, the method 400 and the configuration of the node-pairs in the storage system may allow for replacement of the enclosure without having to take both nodes in the node-pair offline at the first time. A first storage node and a second storage node may be configured to communicate independently of the node enclosure and the first node enclosure may be replaceable without disruption of communication over the network. The method 400 provides for continuous system availability and communication with other node-pairs during replacement of the faulty enclosure.

As shown in block 406, and described herein, a first node (Node 1) of the node-pair may be taken offline, including synchronization, shutdown and power down operations. Once the first node is taken offline, as shown in block 408, the node may be relocated to a temporary enclosure. As shown in block 510, the first node may be reconnected to the second node (Node 2) of the node pair through PCIe interconnects. The first node may also be reconnected to the fabric network and other node-pairs in the storage system. Once installed in the temporary enclosure and reconnected to the system, as shown in block 412, the first node may be brought back online. In block 414, host software on the first and second nodes may resynchronize or re-mirror the data to account for any changes in the system while the first node was down.

As shown in block 416, the second node, still online and operating in the faulty enclosure, may be taken offline. Once offline, as shown in block 418, the second node may be moved to a new, third enclosure. Once installed in the new enclosure, the second node may be reconnected to the first node (in the temporary enclosure) via the PCIe interconnects and reconnected to the fabric network, shown in block 420. The second node, shown in block 422, may be powered up and brought back online. Host software may re-synchronize the first and second nodes, shown in block 424. Both the first node and the second node may be operational and functioning, yet still located in separate enclosures.

As shown in block 426, the process to relocate the first node to the new third enclosure may include taking node offline again, removing it from the temporary enclosure, moving the first node to the new third enclosure, shown in block 428, and reconnecting the first node via the PCIe interconnects and network fabric, shown in block 432. To complete the replacement procedure, another re-synchronization operation is completed between the first node and the second node, shown in block 434. The node-pair may be fully operational and functioning inside the new third enclosure. The node-pair may continue to be monitored as part of the larger system for subsequent failures or faults. In this manner a faulty node enclosure may be replaced without having to disconnect and take offline both nodes of the node-pair at the same time.

Figure 5:
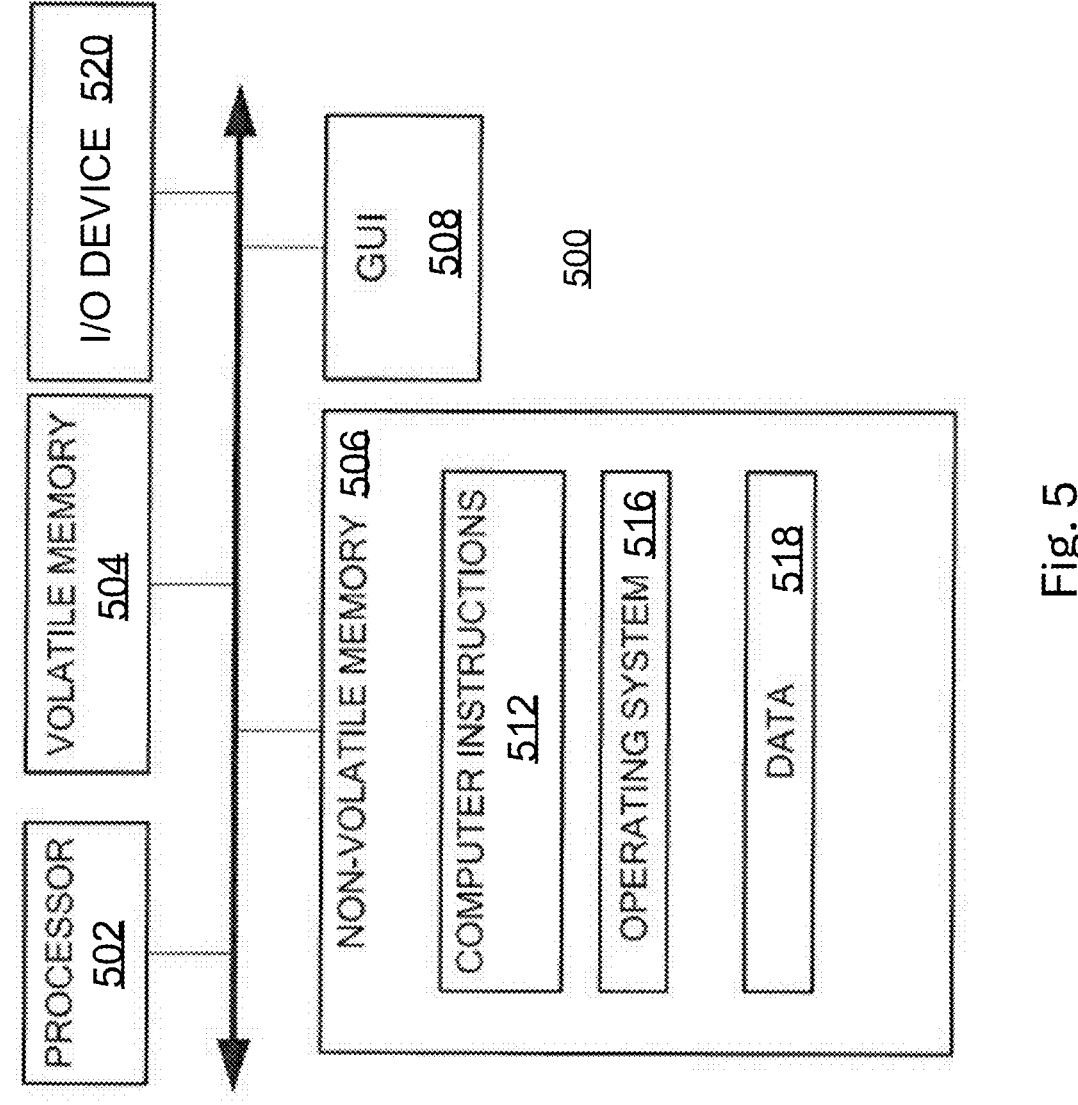
FIG. 5 is a diagram of an example of a computing device, according to aspects of the disclosure.

Referring to FIG. 5, in some embodiments, a computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

FIGS. 1-5 are provided as an example only. In some aspects or embodiments, the term "I/O request" or simply "I/O" may be used to refer to an input or output request. In some embodiments, an I/O request may refer to a data read or write request. At least some of the steps discussed with respect to FIGS. 1-6 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:

providing a first enclosure having a first storage node coupled to a second storage node by a first node-to-node interconnect externally of the first enclosure, wherein the first storage node and the second storage node communicate independently of the first enclosure;

providing a second enclosure having a third storage node coupled to a fourth storage node by a second node-to-node interconnect externally of the second enclosure, wherein the third storage node and the fourth storage node communicate independently of the second enclosure;

providing a network coupling each of the first storage node and the second storage node of the first enclosure to the third storage node and the fourth storage node of the second enclosure;

monitoring, by a storage array system, the first enclosure for a fault condition;

detecting, based on the monitoring, a node enclosure fault of the first enclosure; and responsive to detecting the node enclosure fault, replacing the first enclosure without interrupting communication between the first storage node and the second storage node.

2. The method of claim 1 wherein replacing the first enclosure comprises:

disabling the first storage node and disconnecting the first node-to-node interconnect to the second storage node;

moving the first storage node to a third enclosure;

coupling the first storage node in the third enclosure to the second storage node in the first enclosure with the first node-to-node interconnect and enabling the first storage node; and performing a first sync of the first storage node and the second storage node.

3. The method of claim 2 further comprising:

disabling the second storage node in the first enclosure and disconnecting the first node-to-node interconnect to the first storage node in the second enclosure;

moving the second storage node to a fourth enclosure;

coupling the second storage node in the fourth enclosure to the first storage node in the third enclosure with the first mode-to-mode interconnect and enabling the second storage node;

performing a second sync of the second storage node in the fourth enclosure with the first storage node in the third enclosure;

disabling the first storage node in the third enclosure and disconnecting the first node-to-node interconnect to the second storage node;

moving the first storage node to the fourth enclosure;

coupling the first storage node in the fourth enclosure to the second storage node with the first node-to-node interconnect and enabling the first storage node; and performing a third sync of the first storage node and the second storage node.

4. The method of claim 3 wherein performing the first sync, the second sync and the third sync include mirroring the first storage node and the second storage node.

5. A system comprising:

a first node enclosure housing a first storage node and a second storage node;

a second node enclosure coupled to the first node enclosure by a network;

a first node-to-node interconnect coupling the first storage node to the second storage node externally of the first node enclosure;

a memory; and at least one processor that is operatively coupled to the memory, the at least one processor being configured to perform the operations of:

monitoring the first enclosure for a fault condition;

detecting, based on the monitoring, a node enclosure fault of the first enclosure, wherein the first storage node and second storage node are configured to communicate independently of the first node enclosure and the first node enclosure, upon detection of the node enclosure fault, is replaceable without disruption of communication over the network.

6. The system of claim 5 wherein the second node enclosure houses a third storage node and a fourth storage node coupled by a second node-to-node interconnect externally of the second node enclosure, and wherein the third storage node and fourth node are configured to communicate independent of the second node enclosure.

7. The system of claim 5 wherein the network is an InfiniBand network.

8. The system of claim 5 wherein the network is an unswitched network.

9. The system of claim 5 wherein the first node-to-node interconnect comprises a peripheral component interconnect express (PCIe) interface.

10. The system of claim 5 wherein the first storage node comprises a first host channel adapter coupled to the network and the second storage node comprises a second host channel adapter coupled to the network.

11. The system of claim 5 wherein the first storage node comprises a first peripheral interconnect card configured to receive the first node-to-node interconnect and the second storage node comprises a second peripheral interconnect card configured to receive the first node-to-node interconnect.

12. The system of claim 5 wherein the first storage node and the second storage node are mirrored storage devices.

13. The system of claim 5 wherein the first node-to-node interconnect comprises redundant connections to the first storage node and the second storage node.

14. A storage system comprising:

a first node enclosure housing a first storage node and a second storage node;

a first node-to-node interconnect coupling the first storage node to the second storage node externally of the first node enclosure;

a second node enclosure housing a third storage node and a fourth storage node;

a second node-to-node interconnect coupling the third storage node to the fourth storage node externally of the second node enclosure;

an unswitched network coupling the first storage node to the third storage node and the fourth storage node and coupling the second storage node to the third storage node and fourth storage node;

a memory; and at least one processor that is operatively coupled to the memory, the at least one processor being configured to perform the operations of:

monitoring the first enclosure and the second enclosure for a fault condition;

detecting, based on the monitoring, a node enclosure fault of one of the first enclosure and the second enclosure, wherein the first storage node is configured to communicate with the second storage node independently of the first node enclosure, the third storage node is configured to communicate with the fourth storage node independently of the second node enclosure, and one of the first node enclosure or the second node enclosure, upon detection of the node enclosure fault, is replaceable without disruption of communication over the unswitched network.

15. The storage system of claim 14 wherein the unswitched network is an InfiniBand network.

16. The storage system of claim 14 wherein the first node-to-node interconnect and the second interconnect comprise peripheral component interconnect express (PCIe) interfaces.

17. The storage system of claim 14 wherein each of the first storage node, the second storage node, the third storage node and the fourth storage node comprises a host channel adapter coupled to the unswitched network.

18. The storage system of claim 14 wherein each of the first storage node and the second storage node, comprises peripheral interconnect cards configured to receive the first node-to-node interconnect and each of the third storage node and the fourth storage node comprises peripheral interconnect cards configured to receive the second node-to-node interconnect.

19. The storage system of claim 14 wherein the first storage node is configured to mirror the second storage node and the third storage node is configured to mirror the fourth storage node.

20. The storage system of claim 14 wherein the first node-to-node interconnect includes redundant connections to the first storage node and the second storage node, and the second node-to-node interconnect includes redundant connections to the third storage node and the fourth storage node.

\* \* \* \* \*